US012038775B2

(12) United States Patent
Nesmeev

(10) Patent No.: US 12,038,775 B2
(45) Date of Patent: Jul. 16, 2024

(54) CONTROL DEVICE

(71) Applicant: Evgeny A. Nesmeev, Ulan-Ude (RU)

(72) Inventor: Evgeny A. Nesmeev, Ulan-Ude (RU)

( * ) Notice: Subject to any disclaimer, the term of this patent is extended or adjusted under 35 U.S.C. 154(b) by 0 days.

(21) Appl. No.: 17/794,343

(22) PCT Filed: Jan. 12, 2021

(86) PCT No.: PCT/RU2021/000004
§ 371 (c)(1),
(2) Date: Jul. 21, 2022

(87) PCT Pub. No.: WO2021/158144
PCT Pub. Date: Aug. 12, 2021

(65) Prior Publication Data

US 2023/0132572 A1 May 4, 2023

(30) Foreign Application Priority Data

Feb. 5, 2020 (RU) .......................... RU2020105514

(51) Int. Cl.
*G05G 9/047* (2006.01)
*G05G 5/03* (2008.04)
*G05G 5/05* (2006.01)

(52) U.S. Cl.
CPC .............. *G05G 9/047* (2013.01); *G05G 5/03* (2013.01); *G05G 5/05* (2013.01); *G05G 2009/04766* (2013.01); *G05G 2009/04774* (2013.01); *G05G 2505/00* (2013.01)

(58) Field of Classification Search
CPC ........... G05G 9/047; G05G 5/03; G05G 5/05; G05G 2009/04766; G05G 2009/04774; G05G 2505/00
See application file for complete search history.

(56) References Cited

U.S. PATENT DOCUMENTS

2013/0209256 A1* 8/2013 Yates .................... B64D 43/00 416/112
2015/0035658 A1* 2/2015 Provancher ........... G05G 9/047 340/407.1

OTHER PUBLICATIONS

International Search Report in corresponding International Application No. PCT/RU2021/000004.

* cited by examiner

*Primary Examiner* — Randell J Krug
(74) *Attorney, Agent, or Firm* — Lawrence G. Fridman, ESQ; FEIGIN & FRIDMAN.LLC

(57) ABSTRACT

A control device consists of a handle with buttons and an on/off trigger, a sphere, an optical, electromagnetic or laser sensor, a fixed base with a half-sphere, and a part situated below said base. The device is designed to simulate a response from working mechanisms and can be used for controlling different manned and unmanned devices, air, land and underwater devices, as well as for working with computer equipment and also for controlling spacecraft.

9 Claims, 8 Drawing Sheets

CONTROL DEVICE

FIELD OF THE INVENTION

A control device (hereinafter referred to as a device) is a device consisting of a handle, a stationary base and a mechanism located under a stationary base. The device can be used to control various manned and unmanned vehicles, including flying, ground, underwater, as well as to control work with computer equipment, and in particular to control spacecraft in outer space. In addition, the device can be used to control computer games.

DESCRIPTION OF PRIOR ART

The device of the invention relates to the joystick design, as described for example, in U.S. Pat. No. 4,870,389A. The sidestick designs are also disclosed in the following patent documents: U.S. Pat. No. 5,149,023A, GB2484830A, U.S. Pat. No. 9,051,836B2, U.S. Pat. No. 9,056,675B2, U.S. Pat. No. 9,067,672B2, U.S. Pat. No. 9,405,312B2. All the above-noted devices have several drawbacks that make it difficult to use them to perform controlling functions. Among such drawbacks are a large distance between the handle and the axis of rotation, as in U.S. Pat. No. 5,149,023A; or an insufficient number of degrees of freedom as in U.S. Pat. No. 9,051,836B2. The device of the invention overcomes the above discussed disadvantages.

DETAILED DESCRIPTION OF THE INVENTION

Figure 1:
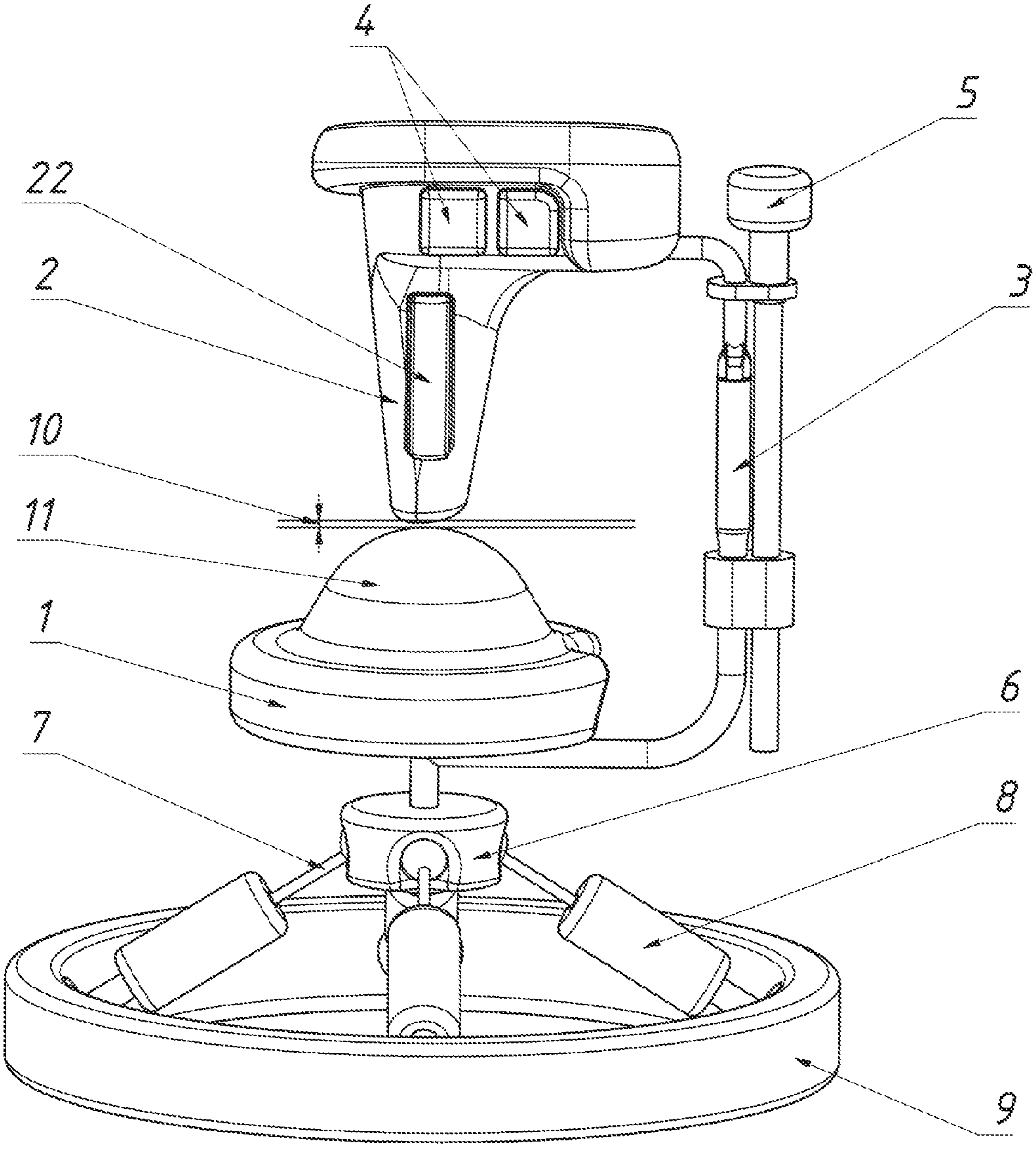
FIG. 1 is a front view of the device showing a stationary base 1, a hemisphere 11, a handle 2, a bracket 3, front buttons 4, an adjustment screw 5, a main mount 6, a core with sphere 7, a solenoid with sphere 8, a bottom of the stationary base 9, a gap 10 and a trigger-switch 22.
Figure 2:
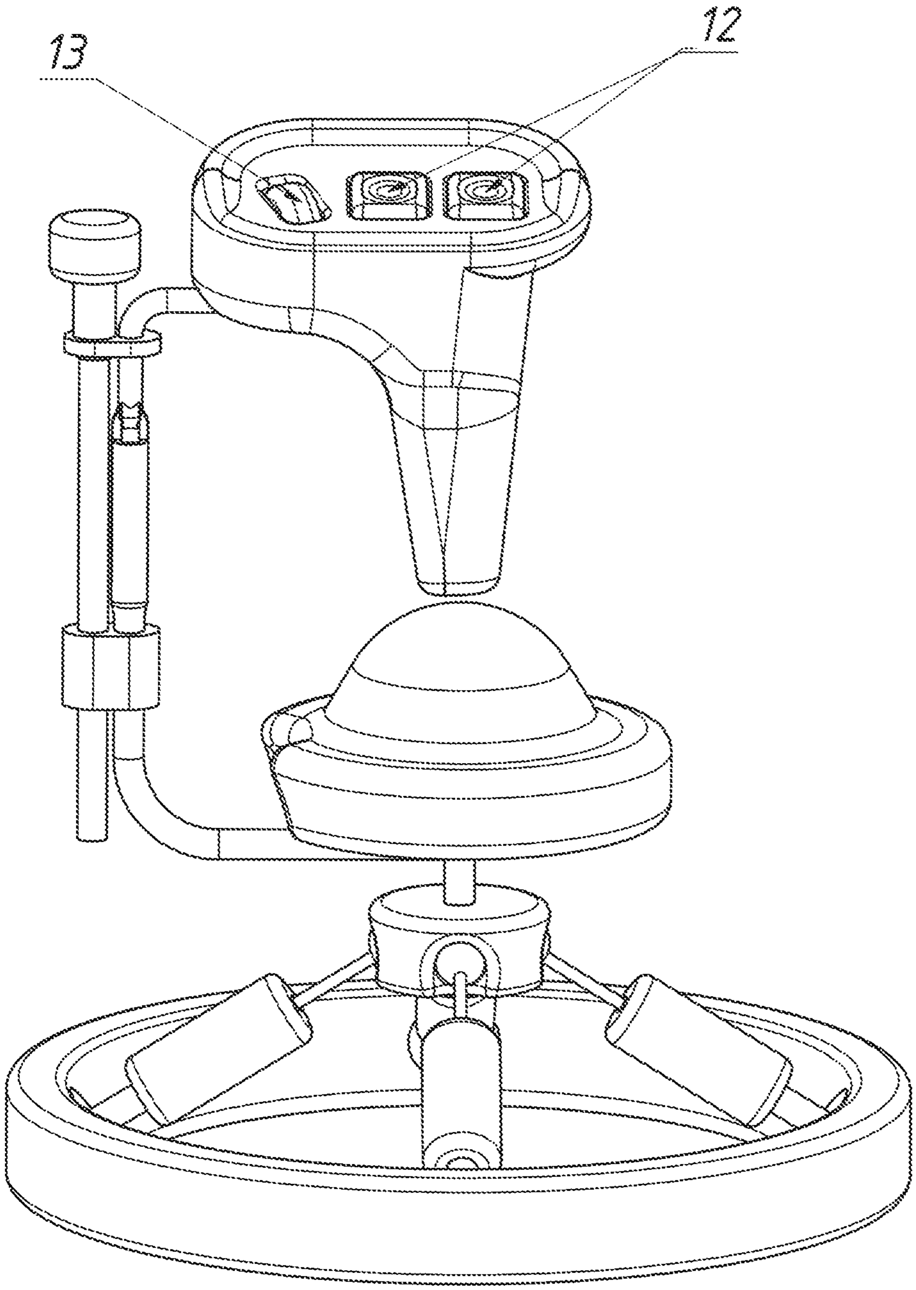
FIG. 2 is a rear view showing rear buttons 12 and a scroll wheel 13.
Figure 8:
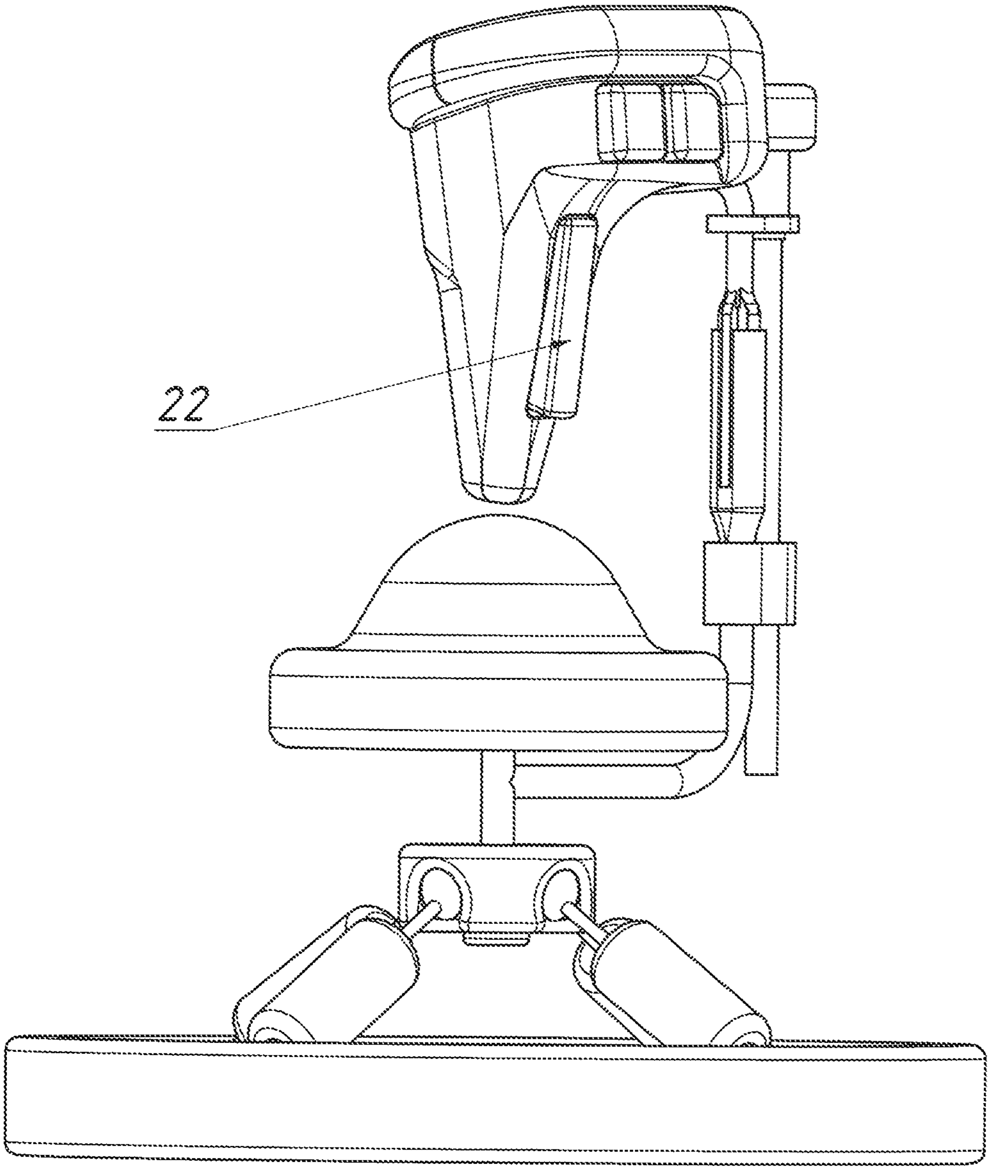
FIG. 8 is still another view of the device showing triggers-switches 22.

The device of the invention consists of a handle 2 (FIG. 1) with front buttons 4 and rear buttons 12 (FIG. 2), as well as a scroll wheel 13. A stationary base 1 has a hemisphere 11 made of slippery material and a trigger-switch 22 (FIGS. 1 and 8). A stationary sphere 14 (FIG. 3) is integrated into the stationary base 1, which has a rigid connection to the handle 2 by means of a bracket 3, which can be adjusted in length using an adjustment screw 5. On the bottom side of the stationary base 1, there is a recess for the bracket 20, which serves to restrict the movement of the bracket 3.

Figure 3:
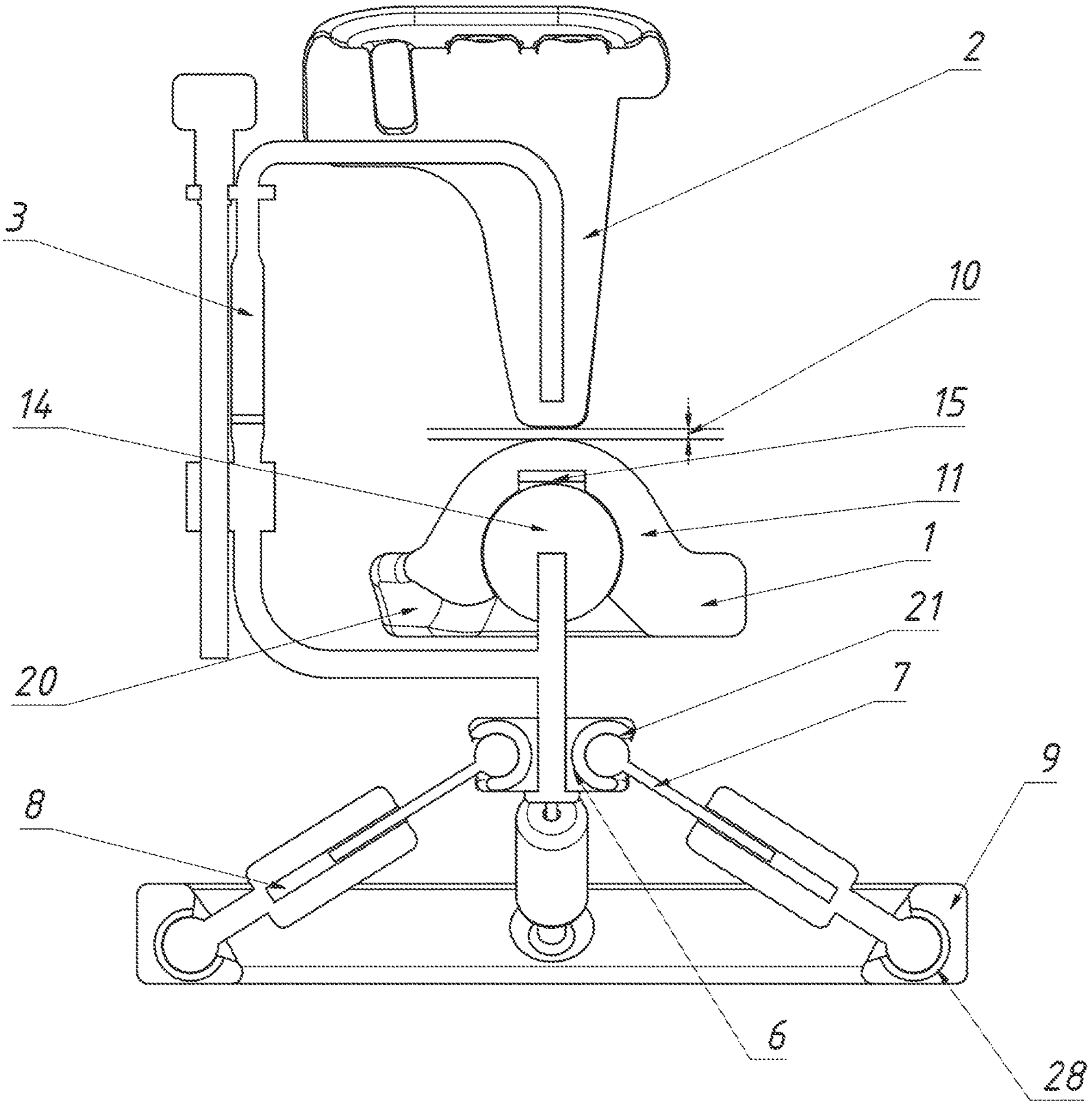
FIG. 3 is semi-section view showing the stationary base 1, the handle 2, the bracket 3, the main mount 6, the core with sphere 7, 11 the hemisphere 11, the gap 10, the sphere 14, the solenoid with sphere 8, the lower stationary base 9, an optical sensor 15, a notch for bracket 20, a spherical cavity of the main mount 21 and a spherical cavity 28.
Figure 4A:
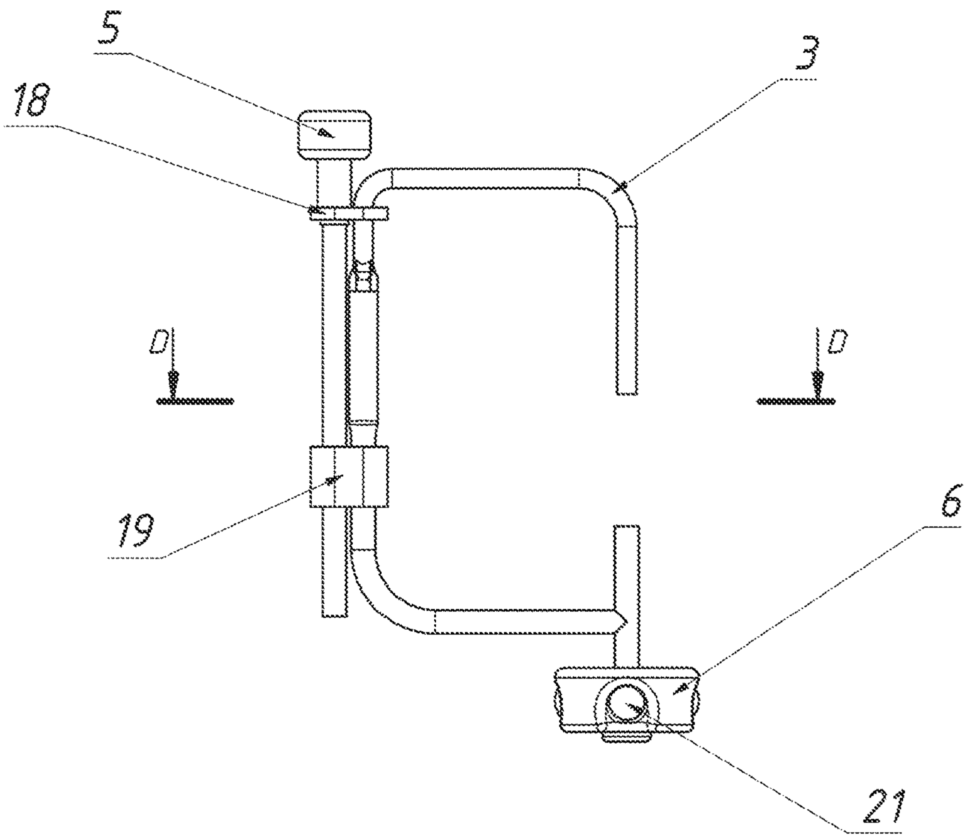
FIG. 4A is a view showing the bracket 3 with the adjustment screw 5, an adjustment screw mount 18, nuts 19, the main mount 6 and the spherical main mount cavities 21.
Figure 4B:
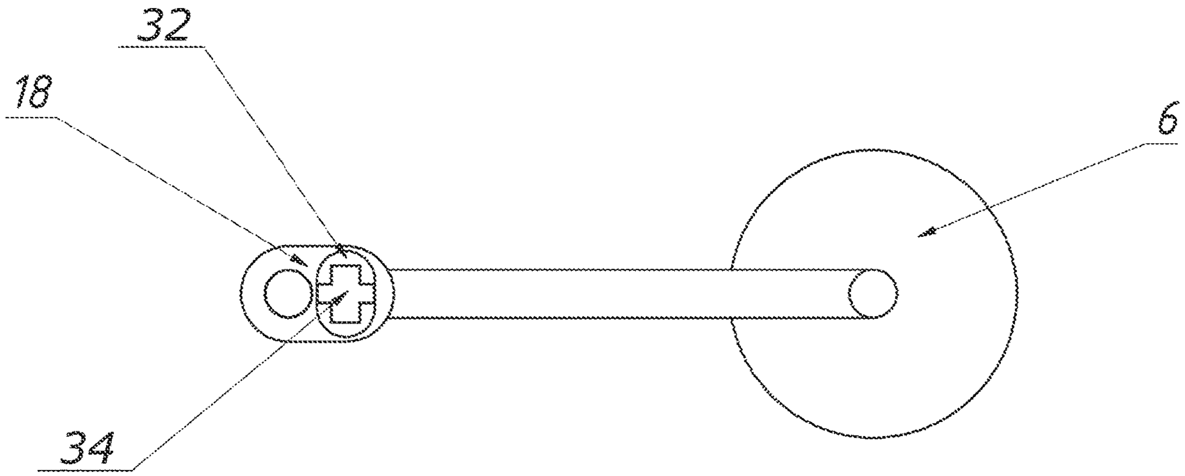
FIG. 4B is a section view according to section line D-D of FIG. 4A showing a bottom of the bracket 32, a top of the bracket 34, an adjustment screw mount 18 and the main mount 6.

The sphere 14 (FIG. 3) is rigidly connected to the main mount 6 through the bracket 3. The main mount 6 has spherical cavities of the main mount 21 (FIGS. 3, 4) into which cores 7 with spheres are inserted, which in turn enter the solenoids 8 with spheres, wherein such spheres are placed in the spherical cavities 28 of the lower stationary base 9 (FIG. 3). The mechanism shown in the figures located below the sphere 14 is intended to simulate feedback from the execution mechanisms of the vehicle controlled by the presented device. In addition, FIGS. 4A and 4B show another embodiment of the design of the bracket 3 consisting of the upper part 34 and the lower part 32, as well as the fastening of the adjusting screw 18, the nut 19, the adjusting screw 5, the main mount 6 with the spherical cavity of the main mount 21. In addition to the presented version of the bracket 3, other designs are possible.

Figure 5:
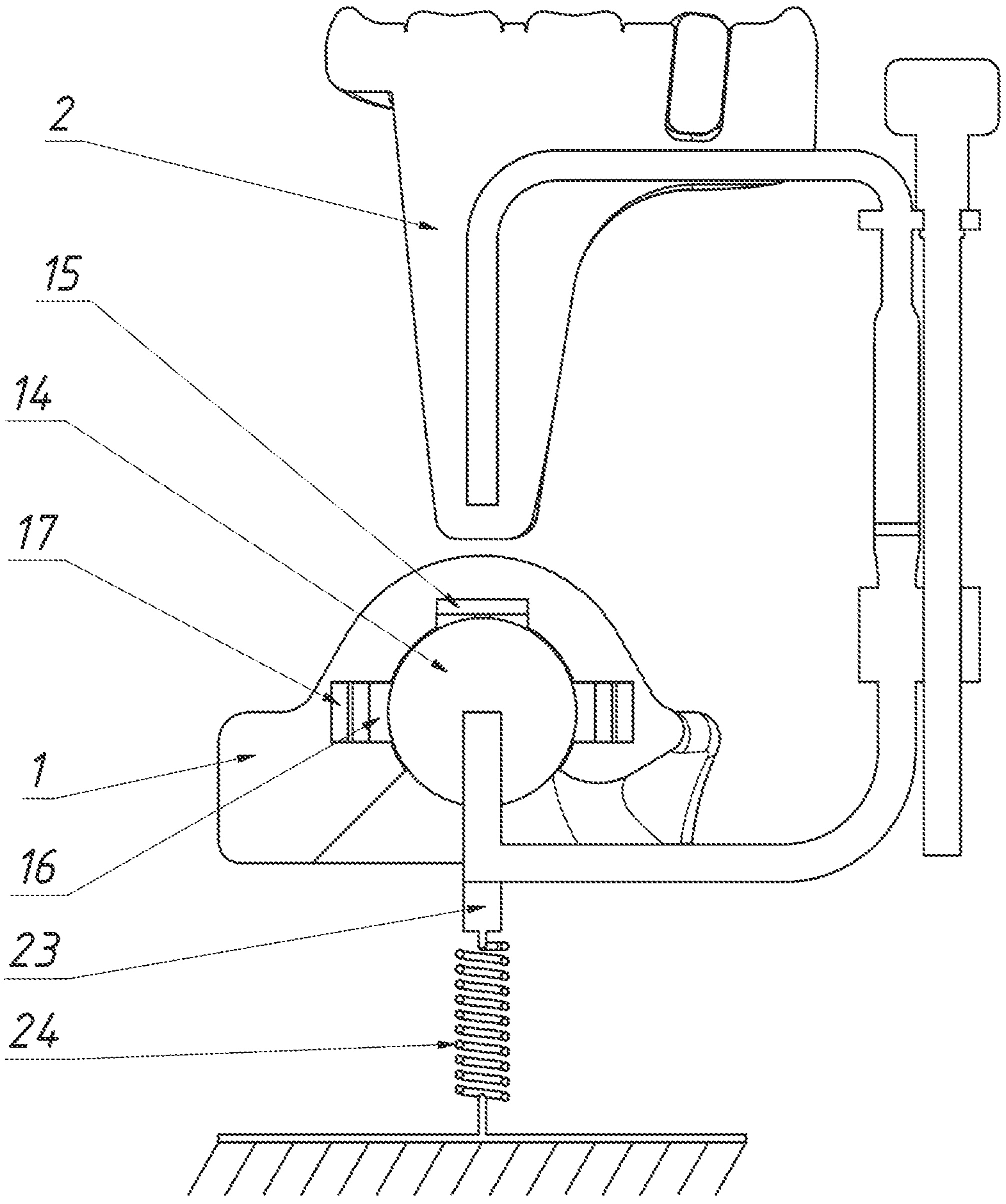
FIG. 5 is another view of the device showing the stationary base 1, the handle 2, the sphere 14, the optical sensor 15, permanent magnet pads 16, electromagnets 17, spring bracket 23 and a spring 24.
Figure 6:
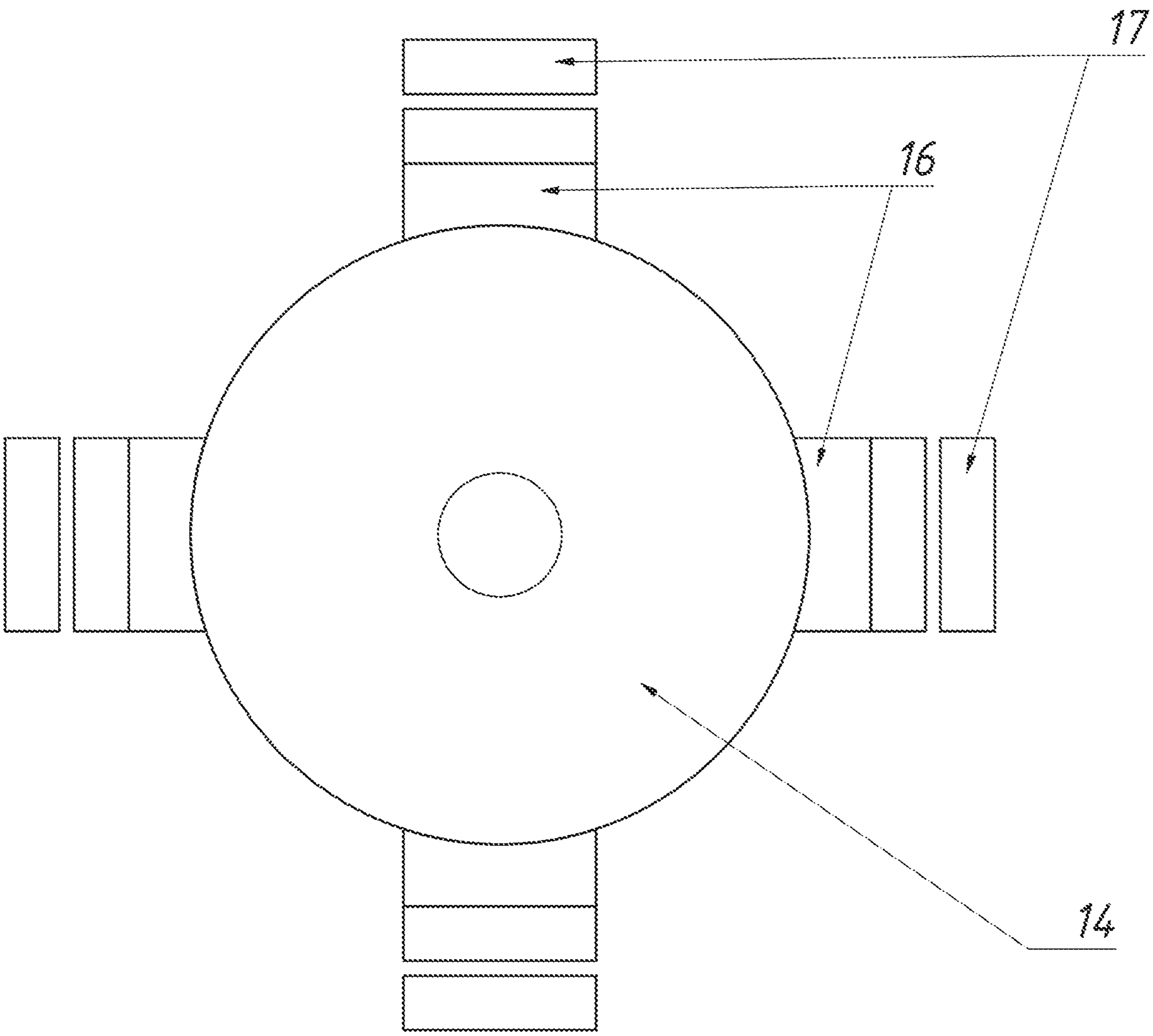
FIG. 6 is a top view showing the sphere 14, the permanent magnet pads 16 and the electromagnets 17.

Another solution is also possible to implement the simulated feedback. For example, as illustrated in FIGS. 5 and 6, where there is provided a stationary base 1 having a sphere 14, an optical sensor 15, an arm 3, a spring bracket 23, and a spring 24. The spring is designed to return the handle 2 to a vertical position. In addition to the spring, it is possible to use a solenoid with a sphere 8 and a core with a sphere 7 or a hydraulic cylinder (not shown in the figures).

On the sides of the sphere 14 (see FIGS. 6 and 7), there are provided pads with permanent magnets 16 which can move a short distance towards the center of the sphere 14 and stationary electromagnets 17. To create an imitation of feedback with actuating mechanisms, an electric current is supplied to electromagnets. During the passage of the current through the windings of the electromagnets 17 a magnetic field is created with the same arrangement of poles in the direction of the sphere. In this case, with the pads having the permanent magnets 16, which are located with the same poles in the direction of the electromagnets, when the electric current is applied to the windings of the electromagnets 17, it will push the magnets 16 to squeeze the sphere 14. Thus, when the handle 2 is moved the user will feel the resistance to his force.

An embodiment is also possible comprising of the following elements (see FIG. 7): the bracket 3, the stationary base 1, the sphere 14, a pendulum indicator arm 25, a pendulum indicator 26, and a stationary hemispherical body with sensors 27. The position of the handle 2 is monitored upon rotation of the sphere 14 located within the stationary base 1. The sphere 14 which, by means of the pendulum indicator arm 25 moves the pendulum indicator 26. The indicator 26 when the position of the handle 2 changes will point to one of the electromagnetic sensors located on the stationary hemispherical body with sensors 27 (the sensors are not shown in the figures). When the handle 2 is moved, the data from the electromagnetic sensors is transmitted to the computing device of the controlled mechanism, thereby determining the direction and distance of movement of the handle 2. Based on the received data, the computing device generates commands and sends them to the executing mechanisms of the controlled vehicle. It is possible to provide the device of the invention for both the right- and left-hand users. You will find below an example of the device applicable for the right-hand user.

Figure 7:
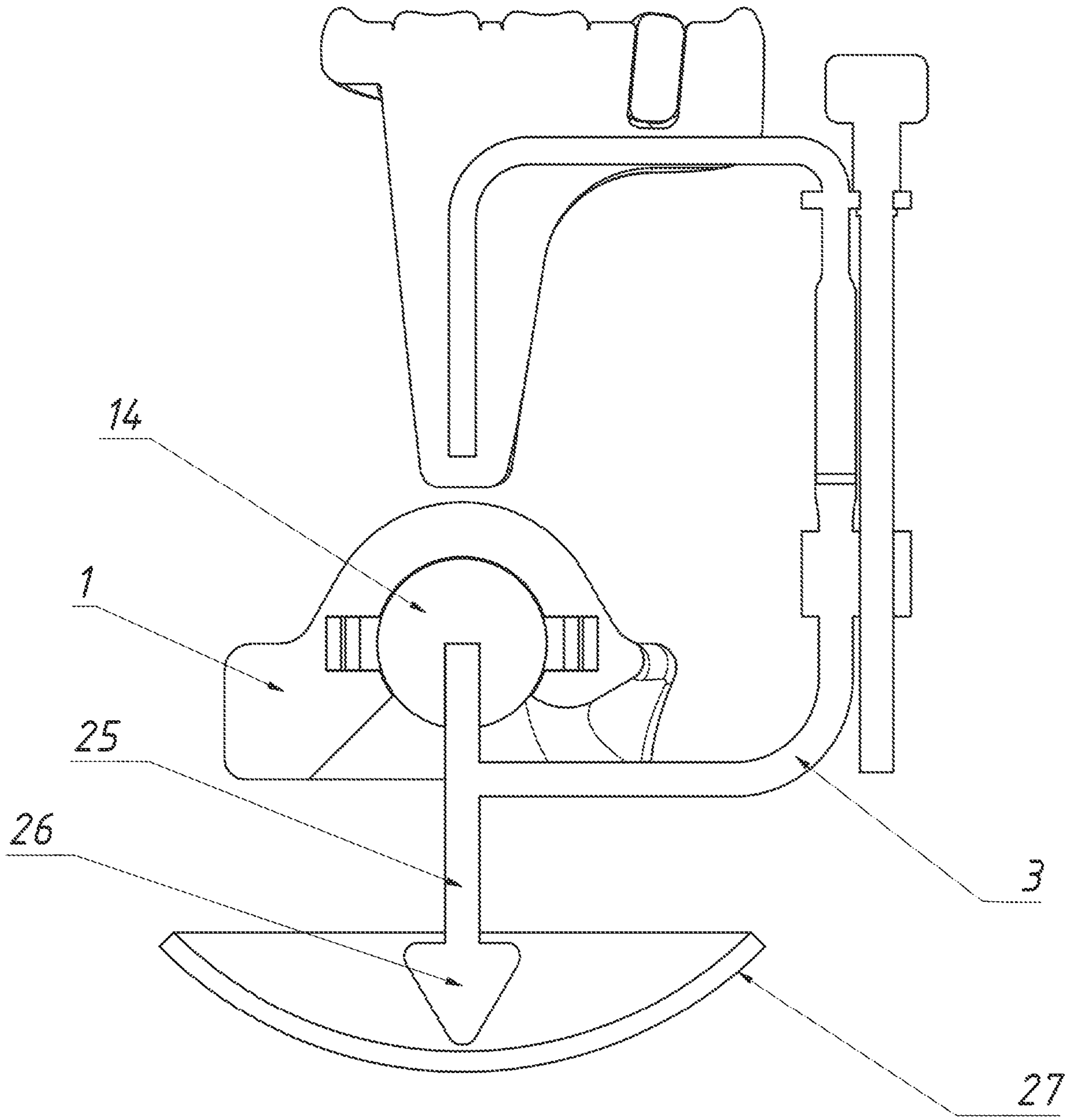
FIG. 7 is a further view of the device showing the stationary base 1, the bracket 3, the sphere 14, a pendulum pointer bracket 25, a pendulum pointer 26 and a stationary hemispherical housing with sensors 27.

The device operates in the following manner: the user holds with his/her hand the handle 2 shaped somewhat narrowed towards the bottom. This shape of the handle 2 is needed so that when the handle is squeezed, the user's hand receives a small force vector directed downward, to create conditions for reliable tactile contact of the user's hand with the hemisphere 11. In this manner, the lateral side of the little finger and the edge of the palm form a "ring" that covers the bottom of the handle 2 and rests on a hemisphere 11 made of slippery material. The thumb of the hand is above or next to the handle 2, where the rear buttons 12 and the scroll wheel 13 are located, while the index finger is on the front of the handle 2, in front of or next to the front buttons 4. The other three fingers (middle, ring, little finger) cover the handle 2 and at the same time can press the trigger switch 22 (FIGS. 1 and 8), designed to turn on the optical sensor 15. When the trigger switch 22 is pressed, the optical sensor 15 (FIGS. 3 and 5) is turned on and it starts reading information from sphere 14 (FIGS. 3, 5, 7). This function can be useful in a situation when during the use of the device the handle 2 is moved, and the bracket 3 reaches the limiting angle of movement and it rests against the wall of the recess for the bracket 20. In this case, the user opens his fingers and releases the trigger switch 22. The trigger switch 22 turns off/disables the optical sensor, so that the user can move the handle 2 to the middle position without fear that during this movement the optical sensor 15 will be in an active state. An embodiment of the device without front buttons 4 is possible. In this embodiment, four fingers of the user's hand, i.e., index, middle, ring, little fingers cover the handle 2 and press the trigger-switch 22.

By holding the handle with his hand in this way, the user can move the handle in all directions, within the sector bounded/limited by the recess for the bracket 20 (FIG. 3). This occurs when the optical sensor 15 continues to read information about the movement of the handle 2, and the side of the little finger and the edge of the palm will retain tactile contact with the hemisphere 11. Tactile contact with the hemisphere 11, made of slippery material, allows the user to accurately retain position of the hand when driving various vehicles and computer equipment. At the same time, the user will be able by holding the handle 2 (which maintains a tactile contact with the stationary base 1 through the user's hand) to fix it in any place of the stationary base 1, without fear that his hand and the handle 2 will move. Moreover, the user, in accordance with the size of his hand, by rotating the adjusting screw 5, can reduce or increase the gap 10, thus changing the length of the bracket 3, consisting of the upper part of the bracket 34 and the lower part of the bracket 32. Accordingly, the distance from the handle 2 to the surface of the hemisphere 11 will also change. A stepping motor can be used in this unit, Thus, adjustment to accommodate the size of the hand can be automated, and if several people use the joystick (sidestick) their data can be entered into the memory unit, so that when changing the user, the length of the bracket 3 will be adjusted automatically.

When using the device and changing the position of the handle 2 relative to the hemisphere 11, the force is transmitted by means of the bracket 3 to the sphere 14 (FIG. 3). When the sphere 14 rotates, the optical sensor 15 directed at the sphere will register this movement and transmit the related data to the computing device. In this manner the computing device which will determine its direction, the trajectory of this action, and then a corresponding command will be sent to the executing mechanisms of the controlled vehicle. At the same time, to simulate the feedback of the executing mechanisms with the user's hand, the device has a mechanism located under the stationary base 1. This mechanism is connected to the sphere 14 through the bracket 3, which, using cores with spheres 7, are fixed in the spherical cavities of the main attachment 21 (FIG. 3) and solenoids with spheres 8 fixed in the spherical cavities 28 of the lower stationary base 9 (FIG. 3). This mechanism creates for the user an imitation of the counteraction of the executing mechanisms of the vehicle controlled by the presented device.

Imitation of the counteraction of the executing mechanisms is carried out by cores with spheres 7 and solenoids with spheres 8 using a computing device in accordance with a program embedded therein that controls the decrease or increase in the voltage of the electric current supplied to some solenoids with spheres 8. This depends on the direction and length of movement of the handle 2. When a current is applied to a solenoid with a sphere 8, it draws/pulls inside a core with a sphere 7, with the help of a magnetic field that has arisen in it. At this time, all other solenoids with spheres 8 located next to it or on the opposite side of the lower stationary base 9 can be supplied with a greater or lesser current. This depends on what motion is recorded by the optical sensor 15. In this case, the user holding the handle 2 with his hand will feel the counteracting force.

Imitation of the counteraction of the executing mechanisms is carried out by cores with spheres 7 and solenoids with spheres 8 using computing device in accordance with the respective program, which controls the decrease or increase in the voltage of the electric current supplied to some solenoids with spheres 8, depending on the direction and length of movement of the handle 2. When the current is applied to the solenoid with the magnetic field pulls into itself a core with a sphere 7. On the other hand, all other solenoids with spheres 8 located next to it or on the opposite side of the lower fixed base 9 can be supplied with more or less current, depending on what movement is recorded by the optical sensor 15, while the user, holding the handle 2 by hand, will feel the opposing force.

The drawings illustrate four pairs of cores with spheres 7 and solenoids with spheres 8, but in a real device their number may be different, and hydraulic mechanisms may be used instead.

The invention claimed is:

1. A control device, comprising:

a handle having an upper part and a lower part which is provided with a trigger-switch;

a curved bracket;

a stationary base; and a mechanism that simulates feedback from execution mechanisms of a vehicle controlled by the control device;

wherein an upper side of the stationary base is provided with a hemisphere;

wherein a main sphere is located inside the hemisphere, wherein the main sphere is rigidly connected to the handle by the curved bracket, and wherein the curved bracket is connected with a side or bottom of the main sphere;

wherein a sensor is provided in the hemisphere;

wherein information about movement of the handle is read from the sphere by the sensor;

wherein said sensor may be turned on or off at a request of a user by means of the trigger-switch;

wherein the mechanism that simulates feedback from the execution mechanisms of the controlled vehicle consists of a lower stationary base and a main mount connected to each other, wherein the main mount is formed with an upper support having multiple upper spherical cavities, and wherein multiple lower spherical cavities are provided in the lower stationary base;

wherein multiple solenoid units are provided at the main mount;

wherein each said solenoid unit extends between a distal portion and a proximal portion, and wherein a sphere is provided at the distal portion of each said solenoid unit and a pocket is formed at the proximal portion of each said solenoid unit;

wherein each said solenoid unit includes a solenoid core having an outer part and an inner part;

wherein, with respect to each said solenoid unit:

the inner part is movably received within the pocket, a spherical member is provided at the outer part, the sphere is movably received within a respective lower spherical cavity of the lower stationary base, and the spherical member is movably received within a respective upper spherical cavity of the upper support;

wherein the mechanism that simulates feedback is energized by an electric current which generates a magnetic field within the multiple solenoid units, so that while the inner parts of the cores are drawn within the pockets, the spherical members and spheres are moved within the respective upper and lower spherical cavities.

2. The control device according to claim 1, further comprising a stepper motor.

3. The control device according to claim 1, wherein said sensor is selected from the group consisting of: an optical sensor, an electromagnetic sensor, and a laser sensor.

4. The control device according to claim 1, wherein the upper part of the handle is provided for engagement with the hand of the user.

5. The control device according to claim 1, wherein the bracket is formed having a c-shaped configuration.

6. The control device according to claim 1, wherein said electrical current is regulated by a computing device and is variable in strength based on data received from the sensor.

7. The control device according to claim 1, wherein the curved bracket is formed with upper and lower parts connected by an elongated middle part, wherein an adjusting screw is provided at the middle part, wherein the lower part is rigidly connected to the main sphere, wherein the upper part is rigidly connected to the handle; and wherein the middle part and the entire curved bracket can be adjusted in length using the adjusting screw.

8. The control device according to claim 7, wherein, by using the adjusting screw, a distance between the handle and the hemisphere can be adjusted.

9. The control device according to claim 8, wherein, by changing a position of the handle relative to the hemisphere, a force is transmitted by means of the curved bracket to the main sphere, and wherein, when the main sphere rotates, the sensor registers such movement and transmits a related data to a computing device to determine a direction of the movement and a trajectory of such action.

* * * * *